July 28, 1942.  T. G. MYERS  2,291,248
SEALING MEANS FOR SUBMERSIBLE STRUCTURES
Filed Feb. 28, 1938  5 Sheets-Sheet 1
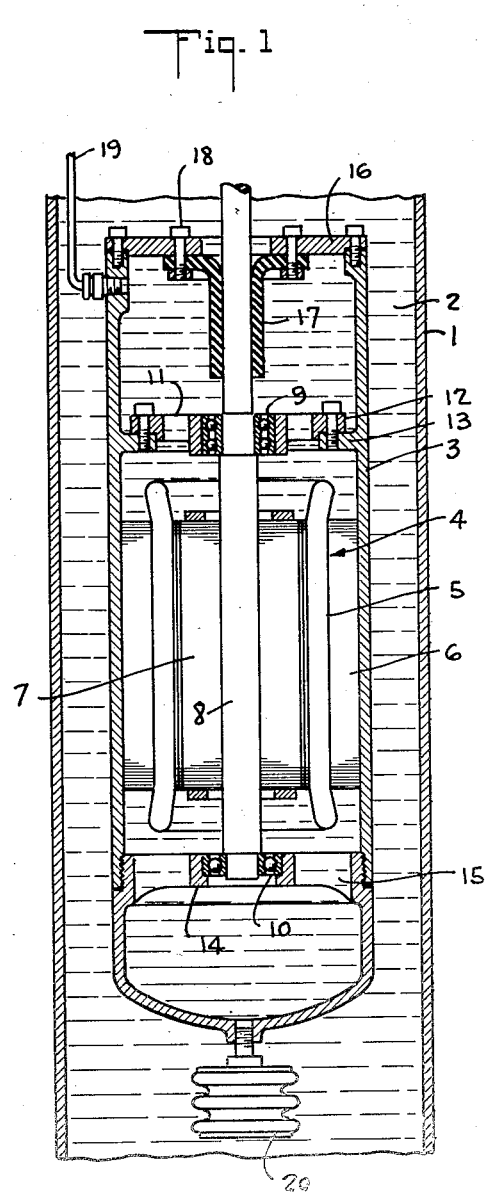
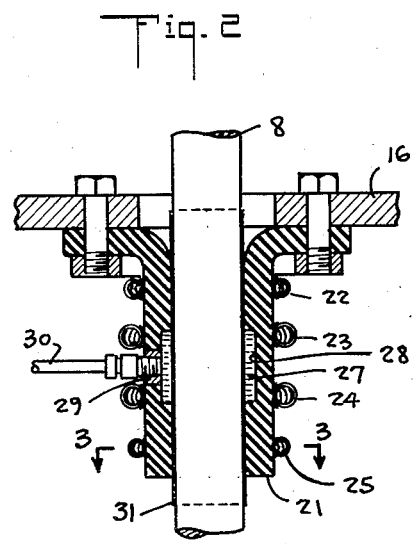
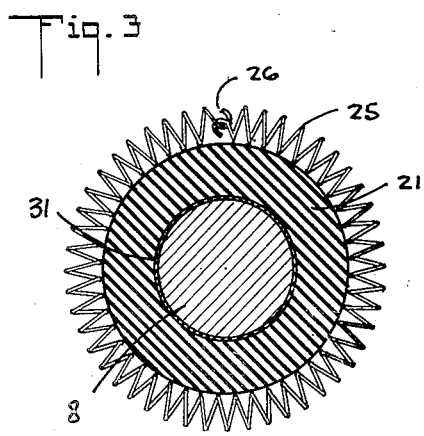
INVENTOR
Thomas G. Myers
BY John Flam
ATTORNEY July 28, 1942.  T. G. MYERS  2,291,248
SEALING MEANS FOR SUBMERSIBLE STRUCTURES
Filed Feb. 28, 1938   5 Sheets-Sheet 2
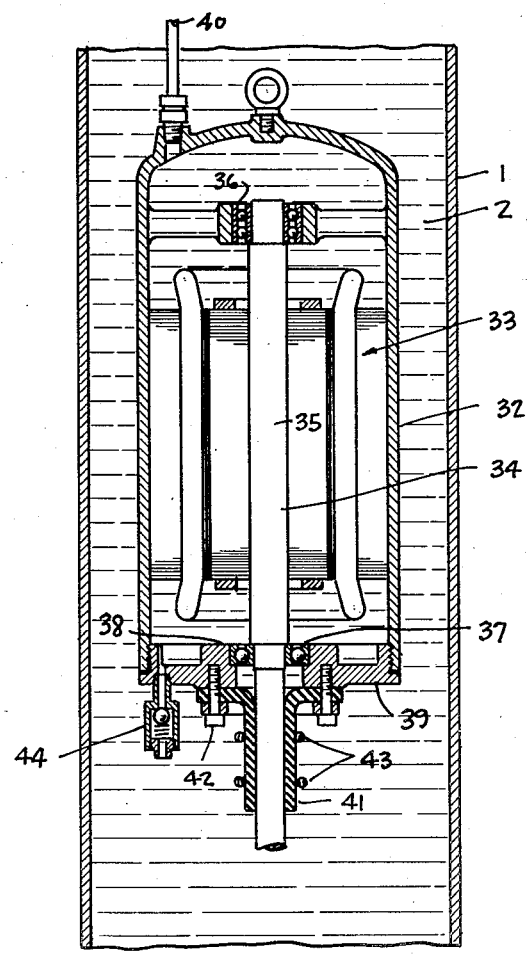
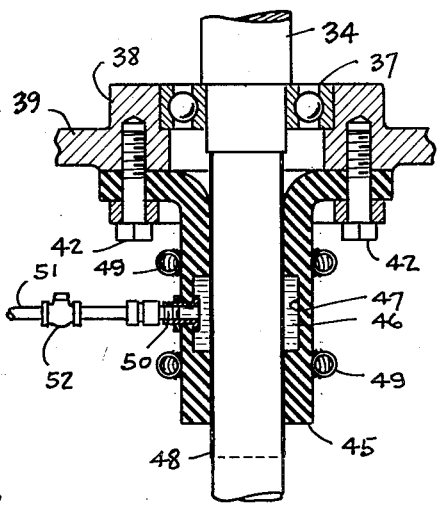
INVENTOR
Thomas G. Myers
BY John F. Law
ATTORNEY

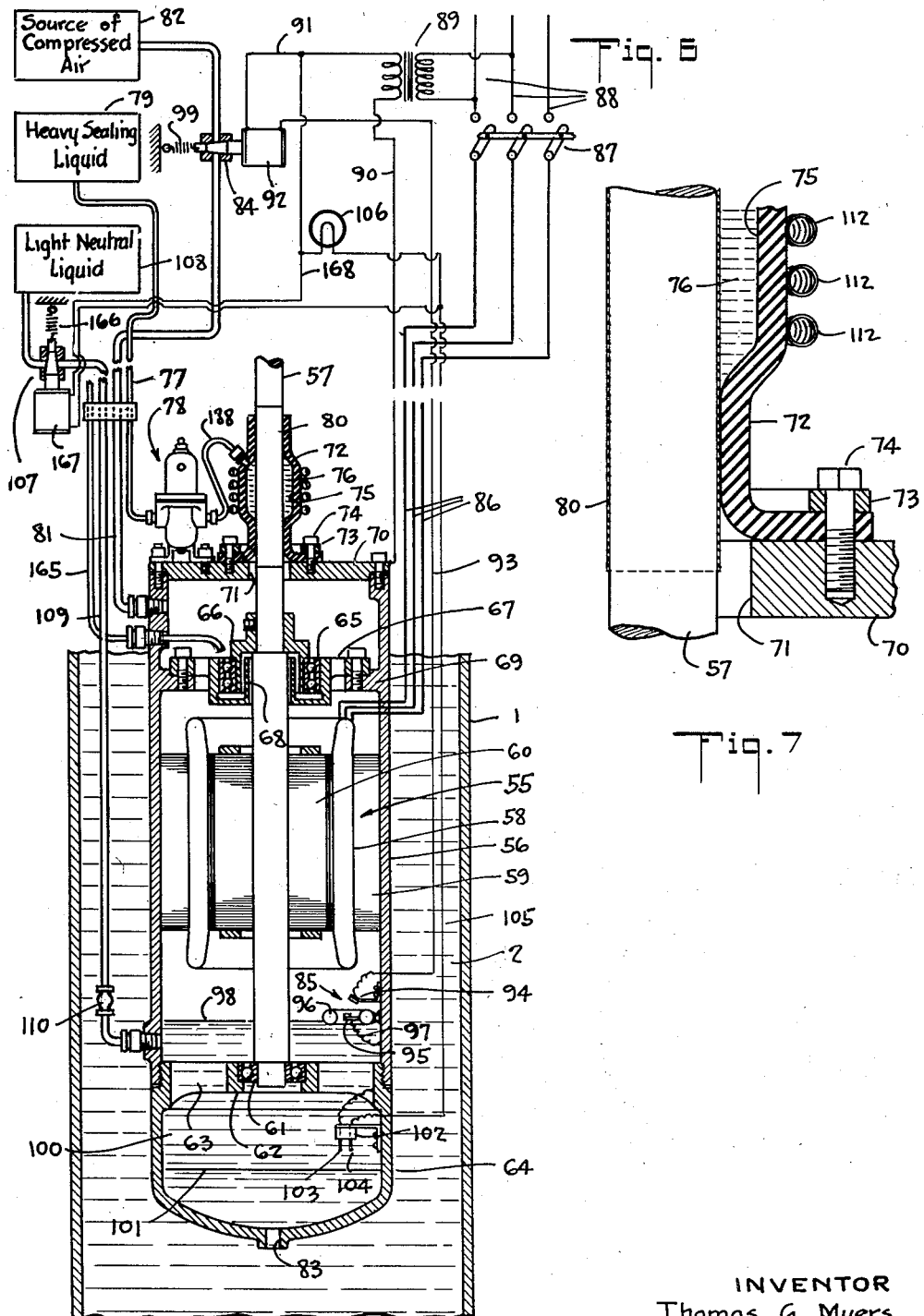

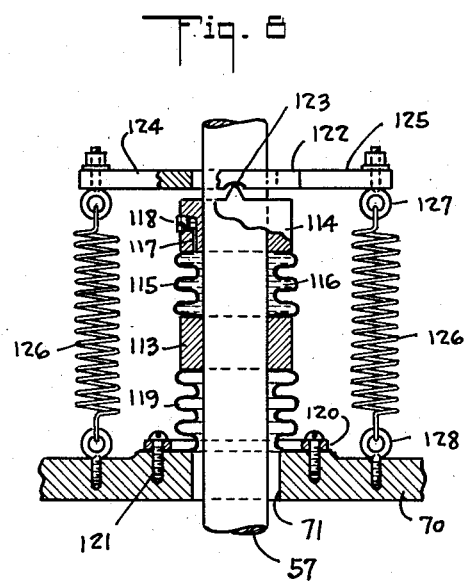
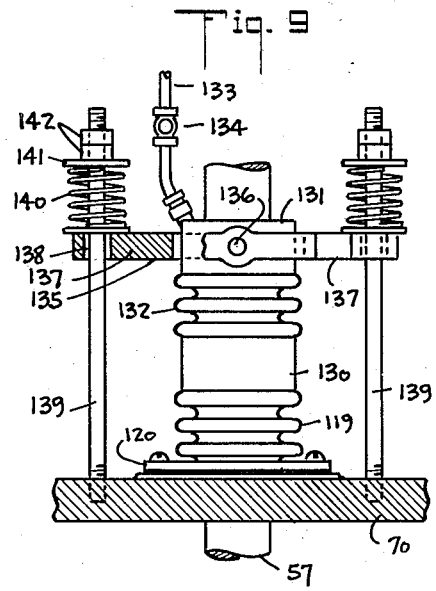
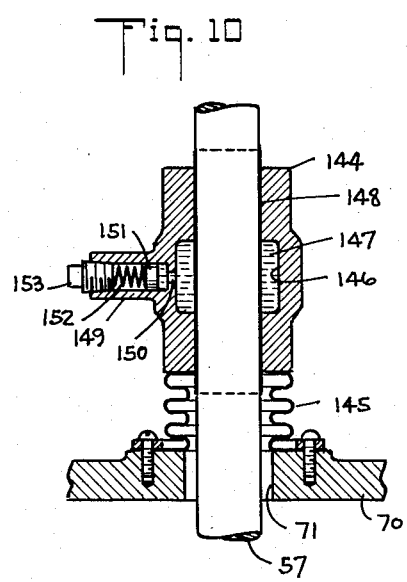
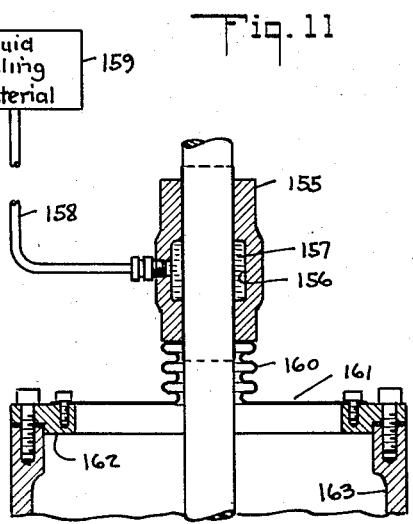

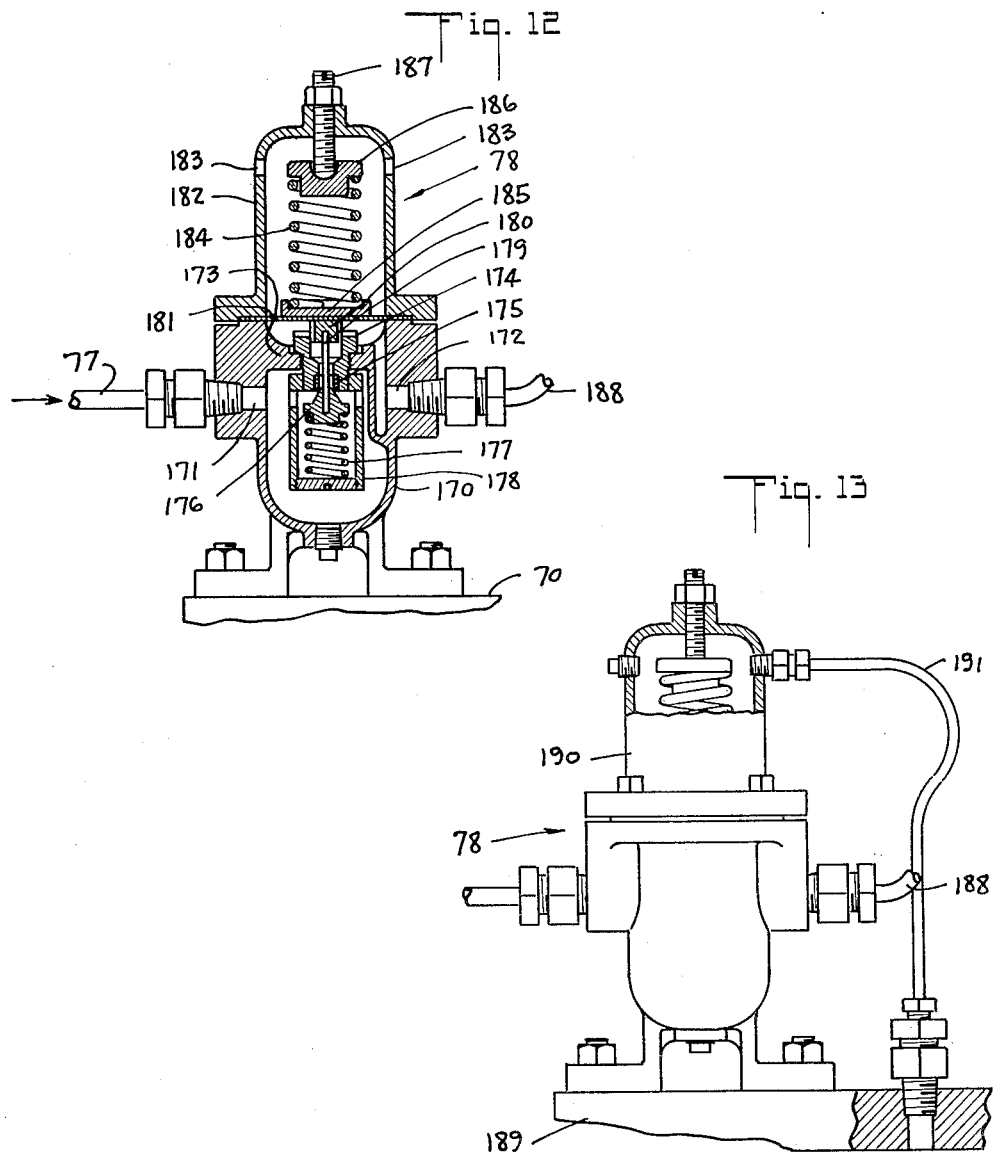

Patented July 28, 1942

2,291,248

UNITED STATES PATENT OFFICE

2,291,248
SEALING MEANS FOR SUBMERSIBLE STRUCTURES

Thomas G. Myers, Los Angeles, Calif., assignor to U. S. Electrical Motors, Inc., Los Angeles, Calif., a corporation of California Application February 28, 1938, Serial No. 193,120

8 Claims. (Cl. 286—9)

This invention relates to submersible structures, such as electrical motors adapted to be lowered into well liquid for direct connection to a pump. The motors are usually of the induction motor squirrel cage rotor type.

Structures of this general character have been described in several other applications filed in the name of Thomas G. Myers and identified as follows:

Submersible structure, Serial No. 173,434 filed November 8, 1937;

Sealed submersible structures, Serial No. 175,896, filed November 22, 1937.

These structures invariably include a casing having provisions for excluding the well liquid, at least from that portion of the casing which carries the electrical windings and the bearings for the rotary portion of the structure. The provisions may include a filling of neutral liquid, such as oil or carbon tetrachloride, or a gas, in the casing; and an appropriate seal to prevent entry of well liquid around the shaft where it extends from the casing.

It is one of the objects of this invention to provide a simple and yet effective sealing means around the shaft.

For this purpose, the seal is provided by the aid of an appropriate resilient sleeve or member that closely surrounds the shaft. It is made from material that resists deterioration by the liquids with which it is in contact. Such material, for example, may be oil resistant rubber or fabric. Accordingly it is another object of this invention to provide a seal of this character.

In some instances it may be desirable to supplement the seal by a liquid seal encompassed within the sleeve and in contact with the shaft. It is another object of this invention to make it possible to provide such a supplemental seal.

It is another object of the invention to provide a liquid seal, such as mercury, in which the liquid extending around the shaft may be placed under a constant pressure, causing it to be urged more securely into sealing relation to the shaft.

This invention possesses many other advantages, and has other objects which may be made more easily apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in longitudinal section, of a device incorporating the invention, shown as submerged in well liquid;

Fig. 2 is a fragmentary sectional view of an apparatus similar to that shown in Fig. 1, but of a modified form of the invention;

Fig. 3 is an enlarged sectional view taken along plane 3—3 of Fig. 2;

Fig. 4 is a view similar to Fig. 1, but of a further modified form of the invention;

Fig. 5 is a fragmentary sectional view, similar to Fig. 4, but of a further modified form of the invention;

Fig. 6 is a view similar to Fig. 1, of another form of the invention;

Fig. 7 is an enlarged fragmentary detail sectional view of a portion of the seal shown in Fig. 6;

Figs. 8, 9, 10 and 11 are fragmentary sectional views illustrating modified forms of seals;

Fig. 12 is a detail sectional view on an enlarged scale of the pressure regulator used with the seal of Fig. 6; and Fig. 13 is a view of a similar pressure regulator used in a slightly different manner.

In Fig. 1, the well is shown as defined by well casing 1, having well liquid 2 therein. This well liquid may be water or the like.

Submerged within the well liquid 2 there is a casing 3 in which is disposed an electric motor 4. This electric motor may be of a conventional induction motor squirrel cage type. It is shown as provided with the primary windings 5, supported on laminations 6, in turn supported by the wall of casing 3. The rotor 7 is shown as mounted on the rotary shaft 8, which extends in this instance upwardly out of the casing 3 for direct connection to a pump (not shown).

The shaft 8 is shown in this instance as supported by upper and lower ball bearing structures 9 and 10 respectively. The ball bearing structure 9 is shown as having its outer race mounted in the central hub of a spider 11. This spider 11 has a flange 12, by the aid of which it may be fastened to the flange 13 extending inwardly of the casing 3.

The lower ball bearing structure 10 is shown in this instance as having its outer race supported in the central boss 14 of a spider 15 extending across the bottom portion of the casing 3.

In order to exclude well liquid from the casing 3, provisions are made to seal around the shaft 8 where it extends through the top 16 of this casing 3. This is accomplished in the present instance by the use of an annular closely fitting sleeve 17, supported on the top 16, as by the bolts 18, which pass through a base flange formed on the sleeve. This sleeve 17 is purposely made of resilient material which is slightly expanded when the shaft 8 is passed through it. As examples of such material may be mentioned oil-proof rubber or woven flexible fabric in which elastic elements may be used to provide a compression force on the shaft 8. Sufficient force may be thus exerted to exclude the well liquid 2. In order to increase the sealing effect of the yielding member 17, the interior of the casing 3 is preferably kept filled under pressure with a neutral liquid, such as oil or carbon tetrachloride. It is not necessary that the material of which sleeve 17 is made be impervious to water, since, if it is soaked with the same neutral liquid as is used to fill the casing, it will be effective to prevent intermixture of the well liquid and the liquid in the casing. Thus, if the casing is filled with oil, fabric soaked in oil should be used, and if carbon tetrachloride is used, to fill the casing, the fabric should be soaked in carbon tetrachloride. A filler pipe 19 is indicated, whereby the filling within the casing may be replenished. If desired, a check valve may be interposed in the filler pipe 19 to prevent reverse upward flow from the casing 3.

It is apparent that the liquid pressures existing within the casing 3 will act radially upon the exposed areas of the sleeve 17 to urge this sleeve 17 against the shaft 8, and in addition to the inherent resilience of the sleeve. Furthermore, this sleeve 17 can follow the vibrations of the shaft 8, which may occur upon even slight wear of the bearings. The seal, therefore, remains unbroken even when there is lateral motion of the shaft. Also, the vibrations of the shaft 8 are well damped out by the sleeve 17.

Ordinarily it is desirable to insure that there will be a liquid pressure within the casing 3 comparable with the liquid pressure due to the gravity head of the well liquid 2; and in some instances it is desirable that the liquid pressures within the casing slightly exceed the pressure exterior of the casing.

As an example of a number of devices to secure the former result, there is shown in this instance an expansible metal bellows 20, fastened into the bottom of the casing 3 and having its interior in communication with the casing. Its exterior area is exposed to the pressure of the well liquid. It is apparent that this variable volume chamber 20 serves to insure that the pressures within and exterior of the casing 3 will be substantially the same. Upon a reduction of interior pressure, the bellows 20 is sufficiently compressed to increase the interior pressure by appropriate reduction in volume; and on the contrary when there is an increase in pressure within the casing 3, the variable volume chamber 20 is expanded until substantial equality is secured.

It may be desirable frequently to maintain the pressure within the casing in excess of the pressure prevailing outside. In this case, a spring loaded relief valve, such as to be presently disclosed in connection with Fig. 4, may be substituted for chamber 20, the neutral liquid being supplied under suitable pressure by means of pipe 19, or a pressure regulator such as disclosed in my copending application, entitled "Submersible structure," Serial No. 173,434, filed November 8, 1937, may be used.

In the form of the invention illustrated in Figs. 2 and 3, the top 16 of the submersible casing 3 is shown, as before, as supporting a resilient sleeve-like member 21. This may be of woven fabric or the like. In order to enhance the pressure effect inherently exerted by the member 21 against the shaft 8, use is made of a series of coiled springs 22, 23, 24 and 25. Each of these springs forms a complete annulus around the sleeve 21, as shown most clearly in Fig. 3. The natural resilience of the springs 22, 23, 24 and 25, and their resistance to expansion, cause a force to be exerted radially inwardly upon the member 21. As shown in Fig. 3, the free ends of the spring may be entwined, as shown at 26, to form the resilient annulus. The filling within the casing may be some liquid, such as carbon tetrachloride, which is heavier than the well liquid.

In order to supplement the sealing effect of the sleeve member 21, a body of heavy sealing liquid 27, such as mercury or the like, is shown as filling an annular recess 28 formed in the sleeve 21. This annular recess 28 provides an annular chamber surrounding the shaft 8 in which the liquid seal 27 may be accommodated. A metal filler bushing 29 may be provided, leading to the recess 28 and securely joined to the flexible member 21. A filler pipe 30 may be connected to the bushing 29.

Those surfaces of shaft 8 which are apt to be in contact with the sealing liquid 27 or the sealing sleeve 21, may be appropriately treated to prevent chemical action. For example, a layer 31 of ceramic enamel or chromium plating or other inert layer, may be provided over this portion of the shaft area. Other ways of reducing or eliminating the possibility of chemical action may be provided, such as nitriding the corresponding surfaces of the shaft 8.

In the two forms of the invention just described, the sleeve 17 or 21 is shown as extending inwardly of the casing. However, such an arrangement is not absolutely essential. For example, in the form of the invention shown in Fig. 4 this arrangement is reversed. In this figure the submersible casing 32 is shown as having the electric motor 33 enclosed therein, with its shaft 34 extending downwardly out of the casing. The shaft, as before, may be supported above and below the rotor 35, as by the aid of the ball bearing structures 36 and 37. The lower ball bearing structure 37 is shown as having its outer race supported within the central boss 38, formed integrally with the bottom or cover 39 of the casing 32. Through this cover the shaft 34 projects downwardly.

As before, the casing 32 is intended to be kept filled with a neutral liquid, such as oil, which is lighter than water or gas, as by the aid of the filler pipe 40.

In this instance, the sealing flexible sleeve 41 is shown as extending downwardly into the well liquid and as fastened, as by the bolts 42, to the cover 39. This flexible or resilient sleeve 41 may be made from the same material as mentioned before. Furthermore, its natural compressive action, due to its being expanded by the shaft 34, may be supplemented by the aid of several annularly disposed coil springs 43, or by the additional liquid seal shown in Fig. 5.

Provisions may be incorporated in this form of the invention also, to insure that the pressure within the casing 32 will be maintained at about the same value as that due to the gravity head of the well liquid. To insure against undue pressure rise within the casing, a conventional relief valve mechanism 44 may be provided. This valve mechanism is intended to open and release some of the neutral filling, should the pressure within the casing 32 reach an undesired high value.

In the form of the invention illustrated in Fig. 5, the yielding or resilient sleeve 45 is again shown as depending outwardly and downwardly of the casing cover 39. In this form of the invention, a body 46 of heavy sealing liquid, such as mercury, may be interposed in the annular recess 47 formed in the member 45 and providing an annular chamber around the shaft 34. The shaft 34, as indicated by the layer 48, may be provided with an inert protective coating, such as mentioned hereinbefore. If desired, several annular coil springs 49 may be provided to serve as a supplemental means for urging the sleeve member 45 against the shaft 34.

In this case also, a metal bushing 50 is shown as leading into the recess 47. This bushing serves to permit filling of this recess with the sealing liquid 46. It may be provided with a filler pipe 51, including a check valve 52 to prevent return flow of the sealing liquid from recess 47.

In the form of the invention illustrated in Figs. 6 and 7, a well is shown again as defined by well casing 1. In this well casing 1 is well liquid 2, almost invariably water, which it is desired to remove by the aid of a pump, not shown.

In order to drive the pump, use is made of an electric motor 55, shown as enclosed in a fluid tight casing 56. The fluid tight casing 56 is intended to be lowered in the well and from it extends a rotary shaft 57. This shaft is intended to be directly connected to the pump.

The casing 56 is indicated as of general cylindrical construction. The stator or primary windings 58 are shown as supported in laminations 59 fastened to the inner wall of the casing 56. The rotor 60, which may be of the conventional squirrel cage type, is shown as fastened to the shaft 57. This shaft 57 is shown as rotatably supported by the aid of ball bearing structures. Thus, at the lower end of the shaft, the ball bearing structure 61 has its inner race supported on a reduced portion of the shaft 57. Its outer race is supported in a boss 62 formed within a spider 63. This spider 63 is shown in this instance as integral with a cap or bottom cover 64 threadedly engaged with the main casing shell.

Adjacent the upper end of the rotor 60, the ball bearing structure 65 is shown as having its inner race supported on shaft 57 by means of an inverted cup 66. Its outer race is supported in a removable spider 67, which includes a well 68 for the purpose of providing lubrication for the bearing and adapted to be supplied with lubricant by means of the tube 165, extending to the top of the well. This spider is shown as attached to the integrally formed flange 69 extending inwardly from the wall of casing 56.

The top of the casing in this instance is shown as formed by a cover member 70 fastened in fluid tight manner to the upper edge of the casing 56. It is provided with a clearance aperture 71 for the upward passage of the shaft 57. The manner in which the well liquid 2 is prevented from entering around the shaft 57 through aperture 71 will now be described.

The seal for shaft 57 includes a non-rotary member 72, which is of yielding material, such as impregnated felt, rubber, or the like. This member closely encompasses and contacts the shaft 57 by its natural elasticity. It is fastened to the top 70 in fluid tight manner, as by the aid of its flange 73, through which the fastening means 74 are intended to pass.

This sleeve-like non-rotary member 72 is shown in this instance as extending upwardly and outwardly of the casing 56, although this arrangement is not absolutely essential. Intermediate the top and bottom of the rotary member 72 an annular recess 75 is formed. In this recess a sealing liquid 76, such as mercury or the like, is intended to be placed, as by the aid of a feed pipe 77, which is connected to a receptacle 79 at the top of the well containing the sealing liquid under suitable pressure, a pressure regulator 78 being interposed between the receptacle 79 and the seal. This is shown as mounted on the cover 70 of the motor casing, and may be enclosed in a protective casing, if desired.

The mercury 76, having a high surface tension, forms an effective obstacle to the passage of well liquid along the shaft 57. Since the body of mercury 76 may exhibit active chemical properties, it is preferable to provide an inactive or inert layer 80 on that portion of shaft 57 which is in cooperative relationship with the seal. Such a layer may be ceramic enamel or other inert material, such as varnish or the like. In this way amalgamation with the body of mercury is effectively prevented.

The pressure of the well liquid, of course, normally acts in a radial direction to compress the sleeve-like non-rotary member against the shaft 57, and thereby to assist in the sealing effect.

In order to enhance the effectiveness of the sealing liquid 76 and to tighten the seal, provision is made to maintain the pressure of the sealing liquid above the pressure of the well liquid surrounding the seal. This ensures that any leakage occurring will be outwardly from the seal and not from the well inwardly. It is desirable that the pressure of the sealing material exceed that of the well liquid at all times by relatively small predetermined amount or differential. As the height of fluid above the casing may vary within rather wide limits, depending on several conditions, among them the operation of the pump, a convenient way in which this may be done is by the provision of the pressure regulating device 78, supported near the seal and subject to the well liquid pressure.

As previously mentioned, the liquid sealing material 76 is supplied under pressure from a receptacle 79, conveniently located at the top of the well, in regulated amount through conduit 77. The automatic pressure control is effected by a pressure regulator 78 interposed in this conduit, and which is shown in greater detail in Fig. 12.

Frame 170 of regulator 78 has an inlet 171 and an outlet 172, on opposite sides of a dividing wall 173. This wall supports a member 174, as by screw threads forming a valve seat 175. A valve closure 176 cooperates with the valve seat and is urged to closing position, as by the spring 177 held in cage 178. There are, however, additional opposing forces acting to open the valve, which forces act to ensure that the pressure of the well liquid adjacent the seal, plus an added pressure, exists on the liquid 76 in the space 75 within the seal.

This closure 176 is fastened to a stem 179 extending through member 174. At its upper end stem 179 is fastened to a guide 180 joined to a diaphragm 181. This diaphragm can be metal or leather or the like, and can be held in place by a cover member 182 apertured as at 183 to permit the well pressure to be exerted on the upper surface of the diaphragm. Supplementing the external pressure of the well liquid is the pressure of a compression spring 184. This spring has a guide or shoe 185 resting on the diaphragm 181, and its upper end rests against a support 186. The pressure of the spring is adjustable by the aid of a set screw 187 in cover 182 to provide an adjustment of the total pressure on diaphragm 181. The lower surface of diaphragm 181 is exposed to the opposing pressure in space 75 via conduit 188.

It is apparent that the diaphragm 181 urges the valve to open when the combined pressure of the spring and well liquid acting on its upper surface exceeds the pressure of the liquid in the seal, acting on its lower surface. Thus, the pressure on the liquid 76 in the seal exceeds that of the surrounding well liquid by a predetermined amount, this amount being regulated by the adjustment of spring 184. If any of the liquid escapes from the seal, as by leakage, so that the pressure is reduced, valve 176 opens and admits additional liquid until the pressure is again established at the predetermined amount.

Since the sleeve 72 is formed of non-rigid material, expansion and contraction of liquid 76 in accordance with temperature variations is accommodated without the attainment of excessive pressure. As the volume of trapped liquid in the seal is small, any change in volume will be slight. To reinforce sleeve 72 and add resilience to it when the sealing liquid is confined, springs 112, similar to the springs shown in Figs. 2 and 3, surround space 75.

Where the pressure within the motor casing is maintained above that of the surrounding well liquid, as mentioned in connection with Figs. 1 and 4, it may be desirable to have the pressure of the liquid 76 maintained at a predetermined differential with respect to the pressure within the casing. In this case, it is only required to permit the pressure of the casing fluid to act on the upper side of diaphragm 181. This may be readily accomplished by placing the device 78 of Fig. 12 interiorly of the motor casing, when the pressure of the casing fluid would be effective on the diaphragm through ports 183.

Or as illustrated in Fig. 13, the regulator 78 may be mounted exteriorly of the casing 189, and provided with a fluid tight cap 190, in place of the ported cap. A tube 191 connects the interior of the cap with the inside of casing 189, permitting the fluid pressure within the casing to act on the upper side of diaphragm 181. As the regulator is the same as that previously described in all other respects, obviously it will act to maintain the pressure on liquid 76 at the predetermined amount above the pressure of the fluid within the casing.

It may be desirable to provide a gaseous atmosphere within casing 56 for the motor to operate in, thereby reducing the friction losses incident to the rotation of the rotor in a liquid, as in the previously described forms. Thus a pipe 81 may lead from casing 56 to source of air or neutral gas, under pressure, indicated at 82. The pressure of this gas must obviously be somewhat greater than the pressure of the well liquid 2 at the depth of the casing, so that when the source of compressed air is placed in communication with the casing, the air will expel the liquid through opening 83 at the bottom of the motor casing.

It is essential that the pressure within the casing be maintained sufficiently great to keep the well liquid out of the motor. This may readily be accomplished by providing a pressure regulator similar to regulator 78, so arranged that compressed air is admitted by the regulator into casing 56 automatically from source 82 to keep the pressure in the casing at a few pounds above the well pressure. Alternatively, where casing 56 is provided with an outlet such as the aperture 83, the pressure in the casing should be low enough so that the air will not be forced out of the casing through opening 83. One way in which this can be done is by providing an electrically operated valve 84, regulating the admission of air and controlled by a float operated switch 85.

Stator 59 of motor 55 is shown as connected by leads 86 and main switch 87 to power mains 88, it being understood that these leads are shown only diagrammatically and in actual practice would be enclosed in a water-proof conduit, joined to the casing in a manner to exclude well liquid. As it is equally important to keep the level of the well liquid in casing 56 below the motor, regardless of whether the latter is energized or not, valve 84 and switch 85 therefor are included in a circuit which is connected to power mains 88 so as to be unaffected by the switch 87.

This circuit may include a step down transformer 89, the primary of which is connected to a pair of the power mains. One side of the secondary may be grounded to the casing 56 by lead 90, the other side of the secondary being connected by lead 91 to the solenoid 92 which operates valve 84. The other terminal of the solenoid is connected by lead 93 to the stationary contact 94 of switch 85. The moving contact 95 of this switch is carried by float 96, pivoted to the wall of casing 56. Contact 95 is connected to the transformer by being grounded to the casing, as by lead 97.

The arrangement is such that when the surface 98 of the liquid within the casing, which liquid serves to support the float, rises to a predetermined point, switch 85 will be closed and complete the circuit through the solenoid 92, energizing the latter and causing it to open valve 84. This admits gas under pressure to the casing, which depresses the liquid level, until switch 85 is opened, permitting valve 84 to close in response to the action of spring 99.

To prevent absorption of the air or gas by the well liquid, it may be desirable to provide a layer of light neutral lubricating liquid, such as oil, on top of the well liquid in the casing 56. This liquid layer is indicated by the numeral 100, and has a surface of contact 101 with the well liquid. Since it is desired to use this layer of oil to lubricate the lower motor bearing 61, switch 85 is placed above the bearing.

It is of course, essential to keep well liquid out of this bearing, and if layer 100 is to be omitted, switch 85 should be placed below the bearing. In order to prevent the surface 101 of the well liquid from reaching bearing 61, as due to partial loss of the oil for any reason, means are provided for replenishing the light neutral liquid whenever this surface reaches a predetermined height. Thus, a container 102 filled with oil under suitable pressure is connected with casing 56 by conduit 109, which is controlled by an electrically operated valve 107. This valve is normally maintained closed by spring 166, and is arranged to be opened by energization of a solenoid 167. A check valve 110 may be provided in the conduit 109 to prevent accidental discharge of oil or gas through the conduit. Means are provided to automatically energize this solenoid. Thus, a member 102, carrying spaced electrodes 103 and 104 is supported on the inside of cap 64. One of these electrodes is connected to transformer 89 by being grounded to the casing, while the other electrode is connected to solenoid 167 by lead 105, and the solenoid in turn is connected to the transformer by lead 168. Since the well liquid is a conductor, when it reaches electrodes 103 and 104, the circuit between them and through the transformer and the solenoid will be completed. As the voltage in this circuit may be low, it will be understood that it may be desirable to include some form of relay. Lead 93 and 105 may be placed in the conduit along with motor leads 86. When surface 101 has been sufficiently lowered to interrupt this circuit, thereby deenergizing solenoid 167, the flow of oil to the casing is stopped by closing valve 107 in response to spring 166. A lamp 106 can be connected in parallel with the solenoid 167, thus serving to give a visual indication where the well liquid reaches the predetermined height in the casing. If desired, another lamp may be similarly connected in the circuit with solenoid 92 and give a visual indication when the surface 98 reaches the predetermined height.

In the form of the invention illustrated in Fig. 8, the casing wall 70 is again shown as having a clearance aperture 71 through which the pump operating shaft 57 extends. In this form of the invention there are a pair of axially spaced non-rotary members 113 and 114 which are made of metal and which have a close fit on the shaft 57. The tolerance between the axially spaced members 113 and 114 and the shaft 57 may be of the order of .0005 inch.

Joining the two members 113 and 114 there is shown a metal bellows structure 115 within which is disposed a body of sealing liquid 116, such as mercury. In this way the two members 113 and 114 and the intervening bellows 115 define an annular space around the shaft 57, through which any well liquid must pass downwardly in order to reach the interior of the casing. The mercury seal 116 may be placed within this annular space, as for example through an aperture 117 closed as by a radial screw plug 118 in the upper non-rotary member 114.

The lower non-rotary member 113 is shown as joined in fluid tight manner to the wall 70, as by the aid of the metal bellows 119, shown as having the flange 120 fastened as by screws 121 to the top of the wall 70.

The yielding connection 119 makes it possible for the shaft 57 to have some whipping or radial motion with respect to the axis of the motor without disturbing the sealing effect of the two members 113 and 114, and without causing undesired vibrations in the structure, or undue wear of the closely fitted members.

In order to create a supplemental fluid pressure upon the body of mercury 116, use is made in this instance of a yoke structure 122. This yoke structure 122 is shown as encompassing the shaft 57 above the member 114. It contacts the diametric knife edges 123, formed on member 114. The radially extending arms 124 and 125 are intended to be pulled downwardly in a resilient manner, by the aid of the tension springs 126, thereby exerting a downwardly directed force upon the member 114. This force, therefore, tends to compress the annular space in which the mercury 115 is located.

The springs 126 may be anchored in any appropriate manner to the arms 124 and 125. For example, this may be accomplished by the eyes 127 attached to the arms. The other ends of the springs 126 may be similarly anchored in the eyes 128 fastened to the wall 70.

Other ways of providing the compressive force may be used. For example, in the form of the invention illustrated in Fig. 9, the non-rotary members 130 and 131 are, as before, joined by the flexible metal bellows 132. These spaced members 130 and 131 are in close sealing contact with the rotary shaft 57. In this instance a feed pipe 133 is indicated leading into the annular space in which the liquid seal is to be accommodated. A check valve 134 prevents reverse flow of the sealing liquid.

In this case the yoke 135 encompasses the upper non-rotary member 131 and is joined to it by the aid of the pins 136 extending radially at opposite sides of the collar 131. The radial arms 137 of the yoke 135 are provided with through apertures 138 through which the stationary upright studs 139 extend beyond the yoke 135. These studs are encompassed by the compression springs 140, urging the yoke downwardly. The upper ends of the compression springs are confined, as by the washers 141 and nuts 142. By appropriate adjustment of these nuts 142, the compression force acting upon the liquid seal may be adjusted.

In the form of the invention illustrated in Fig. 10, the non-rotary sealing member 144 is shown again as tightly encompassing the shaft 57 extending through the clearance aperture 71 of the casing wall 70. This non-rotary member 144 is shown as supported in a yielding manner upon the wall 70, as by the aid of the yielding metal bellows 145.

The intermediate recess 146 is formed in the member 144, defining an annular space around the shaft 57. In this annular space is located the sealing liquid 147, such as mercury. As before, the shaft 57 may be provided with an inactive layer 148, as of enamel or the like.

In order to tighten the seal by supplemental pressure of the liquid 147, use is made in this form of a spring operated piston. Thus the member 144 is provided with a radial extension 149. This extension is hollow and connects, as by the aid of an aperture 150, with the annular recess 146. A piston 151 is slidable within the extension 149 and has its right hand face in contact with the sealing liquid. Its left hand face is subjected to the expanding force of a compression spring 152, confined in the extension 149 as by the screw plug 153. The pressure of spring 152 provides a supplemental pressure upon the liquid 147.

The manner in which the supplemental pressure is exerted on the liquid 147 may be varied. In the form of the invention illustrated in Fig. 11, the non-rotary member 155 surrounds the shaft 57, as before. It has a recess 156 in which the sealing liquid 157 is located. This sealing liquid is in communication, as by a conduit 158, to an elevated source 159 of sealing material. In this way gravity head imposes the supplemental pressure. The lower end of the non-rotary member 155 is shown in this instance as supported by the metal bellows 160. This metal bellows is shown as having an extended bottom flange 161 fastened in fluid tight manner to the top 162 of the casing 163.

What is claimed is:

1. In a submersible structure adapted to be submerged in well liquid, a casing, a shaft extending from the casing, a sleeve of yieldable material suported by the casing and forming between it and the shaft an annular space around the shaft, a liquid seal in said space, and means imposing a contractile force upon the sleeve.

2. In a submersible structure adapted to be submerged in well liquid, a casing, a shaft extending from the casing, a sleeve of yieldable material supported by the casing and forming between it and the shaft an annular space around the shaft, and a body of mercury in said space, said shaft being provided with a suitable surface at the sleeve, that is inert with respect to mercury.

3. In a sealing device for a submersible structure adapted to be submerged in well liquid, and having a shaft extending from the structure, a body of liquid forming a supplemental seal around the shaft, means forming a pair of axially spaced surfaces in sealing contact with the shaft and joined by a yielding wall, said means and said wall together forming an annular chamber around the shaft for confining said sealing liquid, and means exerting a pressure in addition to that of the liquid sealed against, upon said wall for increasing the fluid pressure exerted by said body.

4. In a sealing device for a submersible structure adapted to be submerged in well liquid, and having a shaft extending from the structure, a non-rotary yielding member encompassing and contacting the shaft, said member forming an annular recess around the shaft, a sealing liquid in the recess, and means exerting a compressive force around said yielding member to be effective upon the sealing liquid.

5. In a sealing device between a stationary member and a rotary member, a pair of axially spaced non-rotary members in sealing contact with the rotary member, an intervening yielding member, a body of liquid in said yielding member surrounding the rotary member and forming a supplemental seal thereagainst, means for urging said axially spaced members toward each other and means resiliently supporting the sealing device on said stationary member.

6. In a sealing device around a rotary shaft extending from a casing, a pair of axially spaced non-rotary members in close contact with the shaft, an intervening yielding member joining said axially spaced members, a body of sealing liquid confined by said yielding member and surrounding the rotary member, and means for urging said axially spaced members toward each other.

7. In a sealing device around a rotary shaft extending from a casing, a pair of axially spaced non-rotary members in close contact with the shaft, an intervening yielding member joining said axially spaced members, a body of sealing liquid confined by said yielding member and surrounding the rotary member, means for urging said axially spaced members toward each other, and a flexible member surrounding the shaft, and joining one of the axially spaced members in fluid tight manner to the casing.

8. In a sealing device for a submersible structure having a shaft extending from the structure, said structure being adapted to be submerged in well liquid, a body of liquid forming a seal around the shaft, means for confining said body of liquid out of contact with the well liquid, means yieldably supporting the confining means on the structure, and means for maintaining the pressure of said body at a predetermined differential with respect to the pressure of the well liquid adjacent the seal.

THOMAS G. MYERS.